Nov. 13, 1956 F. C. HALLDEN 2,770,686
PULSE-POWER AMPLIFIER
Filed May 12, 1953
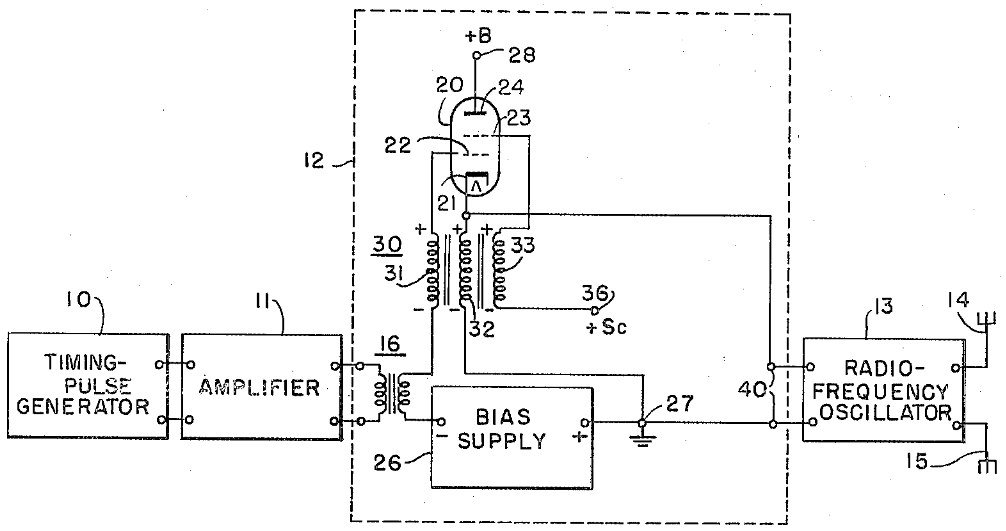

United States Patent Office 2,770,686

Patented Nov. 13, 1956

2,770,686

PULSE-POWER AMPLIFIER

Frederick C. Hallden, Floral Park, N. Y., assignor to Hazeltine Research, Inc., Chicago, Ill., a corporation of Illinois Application May 12, 1953, Serial No. 354,507

5 Claims. (Cl. 179—171)

*General*

The present invention relates to pulse-power amplifiers and, particularly, to such amplifiers for supplying power pulses to devices such as pulsed radio-frequency oscillators.

In many pulse-modulated transmitters, such as those employed in radar and radio-navigation systems, the radio-frequency oscillator thereof requires the application of recurrent high-potential positive-polarity power or space-current pulses in order to produce wave-signal pulses for radiation. For accurate operation of the over-all system in which the transmitter is employed, the pulse envelope of the radiated radio-frequency signal and the initiating high-potential power pulses must be substantially rectangular. Such transmitters conventionally employ an electron-tube amplifier for developing the positive high-potential power pulses. Low-potential pulses supplied to the amplifier input circuit are effective to develop high-potential negative-polarity pulses in its output circuit. A transformer is used to derive pulses of positive polarity therefrom, its primary winding being connected in the anode circuit of the amplifier tube and the pulses developed across the secondary winding being of positive polarity.

In the arrangement described, there is developed across the distributed interwinding capacitance of the transformer a difference of potential of the same order of magnitude as the high-potential pulses developed across the secondary winding. This potential difference across the interwinding capacitance of the transformer results in an undesirable degradation of the rectangular wave form of the high-potential pulses.

Leakage inductance is another factor to be considered in the design of such output transformers. The energy stored by the leakage inductance also causes a further degradation of the rectangular wave form of the pulses. The effects of leakage inductance may be reduced by coupling the windings very closely, but the closer the windings are coupled, the greater the interwinding capacitance becomes.

It is an object of the invention, therefore, to provide a new and improved pulse-power amplifier including an output transformer which substantially avoids one or more of the foregoing limitations of prior amplifiers of this type.

It is a further object of the invention to provide an inexpensive pulse-power amplifier including an output transformer for producing positive high-potential pulses of substantially rectangular wave form.

It is another object of the invention to provide a new and improved pulse-power amplifier including an output transformer for producing positive high-potential pulses in which the effect of the output transformer interwinding capacitance is minimized.

In accordance with the invention, a pulse-power amplifier comprises an electron-discharge device having a cathode, a control electrode, and an anode, and a transformer including first and second windings. The amplifier further includes a pulse-signal input circuit coupled through the first winding to the control electrode and through the second winding to the cathode with the windings connected in series relation in the input circuit. The amplifier also includes supply-circuit terminals coupled to the anode and coupled through the second winding to the cathode to form an energy-supply circuit. The windings are coupled to the control electrode and the cathode with such relative polarity as substantially to eliminate degeneration due to the second winding. The power amplifier additionally includes output circuit terminals coupled to the second winding.

For a better understanding of the present invention, together with other and further objects thereof, reference is had to the following description taken in connection with the accompanying drawing, and its scope will be pointed out in the appended claims.

The single figure of the drawing is a circuit diagram, partly schematic, of a transmitter of pulsed radio-frequency signals including a pulse-power amplifier embodying the present invention.

*Description of transmitter*

Briefly described, the transmitter of pulsed radio-frequency signals comprises a timing pulse generator 10 connected in cascade with an amplifier 11 which serves as a driver, a pulse-power amplifier 12 which is constructed in accordance with the present invention and will be described more fully hereinafter, a radio-frequency oscillator 13, and an antenna system 14, 15. The units 10–15, inclusive, with the exception of the pulse-power amplifier 12 which will be described in detail subsequently, may be of conventional construction and operation so that a detailed description and explanation of the operation thereof are unnecessary herein.

*Operation of transmitter*

Considering briefly the general operation of the above-described transmitter as a whole, the timing pulse generator 10 generates periodic low-potential pulses and applies them to the amplifier 11. The amplifier 11, in addition to amplifying the pulses from the timing pulse generator 10, may also shape those pulses so as to produce low-potential trigger pulses of substantially rectangular wave form. These rectangular trigger pulses are applied to the pulse-power amplifier 12 which develops in its output circuit relatively high-potential pulses of substantially rectangular wave form. These high-potential pulses are applied to the radio-frequency oscillator 13 and cause it to produce pulsed radio-frequency signals having substantially rectangular envelopes. These pulsed radio-frequency signals are supplied to the antenna system 14, 15 whence they are radiated.

*Description of pulse-power amplifier*

Referring now more particularly to the pulse-power amplifier 12 for developing high-potential power pulses, that unit comprises an elecetron-discharge device such as a tetrode 20 or equivalent effectively having a cathode 21, a control electrode 22, a screen electrode 23, and an anode 24. The amplifier 12 also comprises a transformer 30 including a first winding 31 and a second winding 32. The amplifier 12 further comprises a low-potential pulse-signal input circuit coupled through the first winding 31 to the control electrode 22 and through the second winding 32 to the cathode 21 with the windings 31 and 32 connected in series relation in the input circuit. The pulse-signal input circuit includes the first winding 31 of the transformer 30, the secondary winding of a pulse input transformer 16 having a primary winding coupled to the output circuit of the amplifier 11, a bias supply 26, and the second winding 32 of transformer 30.

The bias supply 26 is effective to maintain the electron-discharge device 20 in a nonconductive condition in the absence of input pulses from the signal input circuit.

The pulse-power amplifier 12 also includes supply-circuit terminals 27, 28, for a source of potential +B, coupled to the anode 24 and coupled to the cathode 21 through the second winding 32 for supplying space current to tube 20. Thus, the second winding 32 is in a common portion of the anode-cathode or energy-supply circuit and the signal input circuit.

The pulse-power amplifier 12 further includes an energy-supply circuit coupled between the screen electrode 23 and the cathode 21 and including the second winding 32 and circuit means for substantially eliminating signal-frequency potential differences between the screen electrode 23 and the cathode 21. The energy-supply circuit may include, for example, a second pair of supply-circuit terminals 36, 27, for a source of potential +Sc, coupled to the screen electrode 23 through a third winding 33 of the transformer 30 and coupled to the cathode 21 through the second winding 32 of the same transformer in which case the third winding 33 constitutes means for substantially eliminating signal-frequency potential differences between the screen electrode 23 and the cathode 21. The coefficients of coupling between windings 31 and 32 and between windings 32 and 33 of the transformer 30 are substantially unity. Such a high degree of coupling has been obtained, for example, by using an iron core and making the windings 31, 32, and 33 in a trifilar fashion. The voltage transformation ratio of the transformer 30, that is the ratio of the voltage across one winding to that of each of the other windings is also substantially unity. The windings are coupled to the control electrode 22, the screen electrode 23, and the cathode 21 with such relative polarity as substantially to eliminate degeneration due to the second winding 32. To this end, the polarity of the terminal of the first winding 31 coupled to the control electrode 22 is the same as that of the terminal of the second winding 32 coupled to the cathode 21. Output circuit terminals 40, 40 are coupled to the second winding 32 of the transformer 30 and to the input circuit of raio-frequency oscillator 13.

*Operation of pulse-power amplifier*

In considering the operation of the pulse-power amplifier just described, it will be assumed that the control-electrode bias supply 26 is normally effective to maintain the tube 20 nonconductive. When the amplifier 11 delivers and input trigger pulse to the primary winding of pulse input transformer 16, the corresponding trigger pulse developed across the secondary winding is applied between the control electrode 22 and cathode 21 through the windings 31 and 32. This trigger pulse overcomes the control-electrode bias and causes the tube 20 to become conductive, the anode-cathode current of the tube 20 flowing through the second winding 32 of the transformer 30. This flow of current through the second winding 32 develops a high-potential pulse thereacross. Because the second winding 32 is common to the input and the output circuits of the pulse-power amplifier 12, the high-potential pulse signal potential across the winding 32 tends to cause pulse signal degeneration. The second winding 32, however, is electromagnetically coupled to the first winding 31 in the signal input circuit and, since the voltage transformation ratio is substantially unity and because of the polarity of connections, a voltage is developed across winding 31 which is substantially equal to and of the same polarity as that developed across the second winding 32. Therefore, the high-potential pulse potentials developed at the control-electrode 22 and cathode 21 vary in the same manner and degeneration due to the second winding 32 is substantially eliminated, hence, enabling amplification to occur. The high-potential pulse developed across the second winding 32 is applied to the output circuit terminals 40, 40.

Since the potential variations across the winding 31 are equal to, and of the same polarity as, those across the winding 32, there is effectively no difference of potential across the distributed capacitances between the windings. No energy, therefore, flows into these capacitances, hence the effect thereof is substantially eliminated. As a result, degradation of the wave form of the output pulses developed across winding 32 is avoided and rectangular output pulses are developed. The manner in which the transformer 30 is coupled in the pulse-power amplifier circuit effectively eliminates distributed interwinding capacitance and also permits the windings to be very closedly coupled, thereby reducing leakage inductance.

The purpose of the third winding 33 of transformer 30, which is coupled in the screen electrode-cathode energy-supply circuit, is to maintain the screen electrode-cathode potential of the tube 20 substantially constant during the conductive intervals of the tube 20 so that the screen electrode may perform its normal function. In place of the third winding 33 the screen electrode-cathode potential may be maintained constant by means of a conventional screen electrode-cathode condenser, in which case the customary screen-electrode isolating resistor would also be required.

While applicant does not intend to limit the invention to any articular design constants, the following values have been found suitable for the invention:

| | |
|---|---|
| Tube **20** | Type QM–190. |
| Turns ratio of transformer windings **31 32, 33** | 1:1:1. |
| Inductance of windings **31, 32**, and **33** | 200 microhenries. |
| +B | +1500 volts. |
| +Sc | +750 volts. |
| Bias voltage | −150 volts. |
| Magnitude of input pulses | +200 volts. |
| Magnitude of output pulses | +1000 volts. |
| Output pulse current | 2.5 amperes. |

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A pulse-power amplifier comprising: an electron-discharge device having a cathode, a control electrode, and an anode; a transformer including first and second windings; a pulse-signal input circuit coupled through said first winding to said control electrode and through said second winding to said cathode with said windings connected in series relation in said input circuit; supply-circuit terminals coupled to said anode and coupled through said second winding to said cathode to form an energy-suply circuit; said windings being coupled to said control electrode and said cathode with such relative polarity as substantially to eliminate degeneration due to said second winding; and output circuit terminals coupled to said second winding.

2. A pulse-power amplifier comprising: an electron-discharge device having a cathode, a control electrode, and an anode; a transformer including first and second windings, the coefficient of coupling between said windings, being substantially unity effectively to eliminate leakage inductance; a pulse-signal input circuit coupled through said first winding to said control electrode and through said second winding to said cathode with said windings connected in series relation in said input circuit; supply-circuit terminals coupled to said anode and coupled through said second winding to said cathode to form an energy-supply circuit; said windings being coupled to said control electrode and said cathode with such relative polarity as substantially to eliminate degeneration due to said second winding; and output circuit terminals coupled to said second winding.

3. A pulse-power amplifier for developing high-potential output pulses comprising: an electron-discharge device having a cathode, a control electrode, and an anode; a transformer including first and second windings, the voltage transformation ratio of said transformer being substantially unity; a low-potential pulse-signal input circuit coupled through said first winding to said control electrode and through said second winding to said cathode with said windings connected in series relation in said input circuit; supply-circuit terminals coupled to said anode and coupled through said second winding to said cathode to form an energy-supply circuit; said windings being coupled to said control electrode and said cathode with such relative polarity as substantially to eliminate degeneration due to said second winding; and output circuit terminals coupled to said second winding for deriving said high-potential pulses.

4. A pulse-power amplifier comprising: an electron-discharge device having a cathode, a control electrode, a screen electrode, and an anode; a transformer including first and second windings; a pulse-signal input circuit coupled through said first winding to said control electrode and through said second winding to said cathode with said windings connected in series relation in said input circuit; supply-circuit terminals coupled to said anode and coupled through said second winding to said cathode to form an energy-supply circuit, circuit means for supplying an operating potential to the screen electrode for substantially eliminating signal-frequency potential differences between said screen electrode and said cathode; said windings being coupled to said control electrode and said cathode with such relative polarity as substantially to eliminate degeneration due to said second winding; and output circuit terminals coupled to said second winding.

5. A pulse-power amplifier comprising: an electron-discharge device having a cathode, a control electrode, a screen electrode, and an anode; a transformer including first, second, and third windings; a pulse-signal input circuit coupled through said first winding to said control electrode and through said second winding to said cathode with said windings connected in series relation in said input circuit; supply-circuit terminals coupled to said anode and coupled through said second winding to said cathode to form an energy-supply circuit; an energy-supply circuit coupled through said third winding to said screen electrode and said cathode; said windings being coupled to said control electrode, said screen electrode, and said cathode with such relative polarity as substantially to eliminate degeneration due to said second winding; and output circuit terminals coupled to said second winding.

References Cited in the file of this patent

UNITED STATES PATENTS

| | | |
|---|---|---|
| 2,452,563 | Glover | Nov. 2, 1948 |
| 2,591,406 | Carter et al. | Apr. 1, 1952 |